April 2, 1929.  M. MAAG  1,707,442
COMPENSATING NUT
Filed Sept. 26, 1923
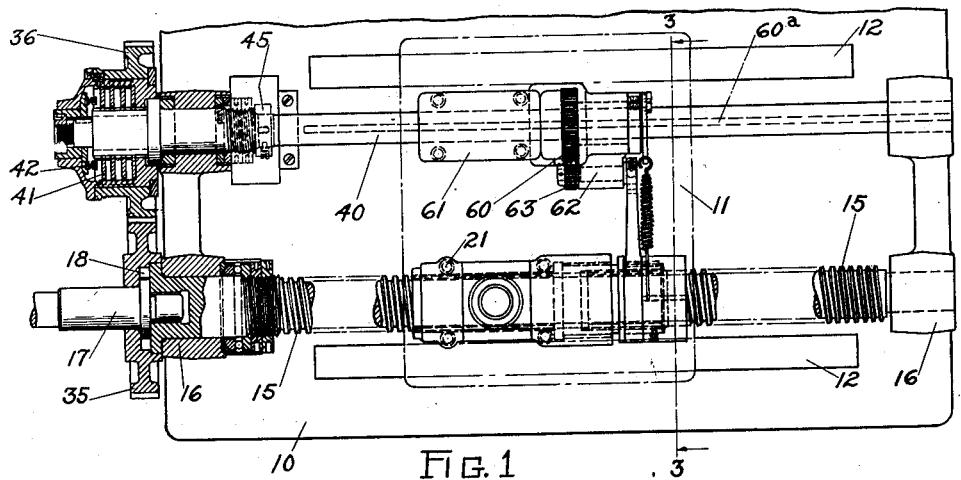
Fig. 1
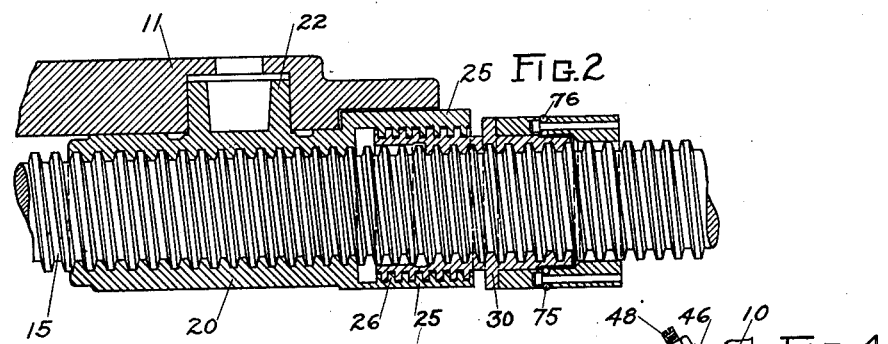
Fig. 2
Fig. 4
Fig. 3
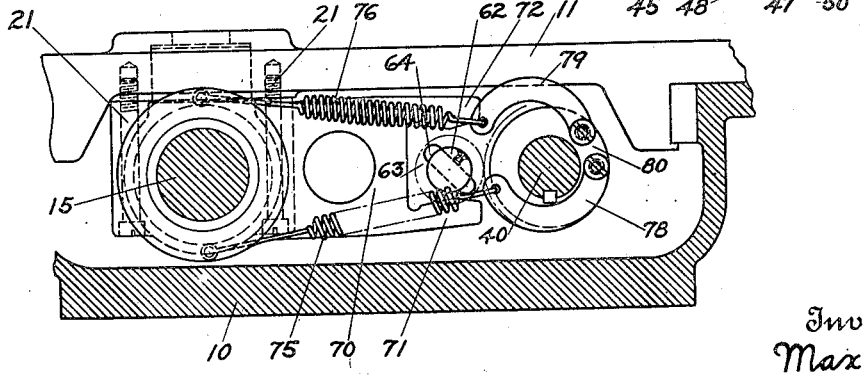
Inventor
Max Maag
By Joseph K. Schofield
Attorney Patented Apr. 2, 1929.

1,707,442

UNITED STATES PATENT OFFICE.

MAX MAAG, OF SCHWAMENDINGEN, SWITZERLAND, ASSIGNOR TO MAAG GEAR WHEEL AND MACHINE COMPANY, LTD., OF ZURICH, SWITZERLAND, A CORPORATION OF SWITZERLAND.

COMPENSATING NUT.

Application filed September 26, 1923. Serial No. 664,940.

This invention relates to a compensating nut construction for precision screws in which means are provided for taking up the lost motion, or back lash, between the thread engaging parts of the nut and screw.

One of the objects of the invention is to provide a screw with an improved form of two part nut so that rotation of the lead screw will advance the nut forward or rearward without lost motion relative to the screw. Another object of the invention is to provide a supplemental nut engaging the screw and attached to the main nut by a threaded connection having a different lead than to the lead of the precision screw. It is also an object of the invention to provide means for adjusting the position of the supplemental nut relative to the first or main nut so that the back lash, or lost motion, between the main nut and the screw may be taken up on either side of the threads of the main nut when the screw is rotated in opposite directions.

In all types of machine tools in which a high degree of precision is attained, it is essential that parts such as a movable table, or work holding and positioning member, should be positioned accurately during the operation of the machine. In many types of machine tools the adjustment or positioning of the table is accomplished by a precision screw. It is obvious, however, that if lost motion exists between the flanks of the screw and nut the position of the table may be inaccurate, particularly if the screw is to be operated in either direction during the cutting or other operation. It is to avoid this source of errors in an improved manner that the present invention has been devised.

In the present invention use is made of a precision screw which may be rotated in either direction to move a work carrying table in opposite directions, the rotation of this screw serving to advance a nut therealong to which nut the table may be attached.

In order to prevent back lash between this nut and the screw during rotation of the screw an additional nut forming a part attached to and supplementing the action of the first nut is also carried by the movable table and mounted on the screw. An actuating means is provided to so position this supplemental nut relative to the main nut that all lost motion between the main nut and the screw is avoided as soon as the screw is moved in either direction. The arrangement is such that the lost motion may be taken up on either side of the screw threads dependent upon the direction in which the screw is rotated.

An additional feature of my invention is to so operate the supplementary nut that the parts are not bound together at each reversal of direction of the screw which would prevent the table or other part attached to the main nut being moved in opposite directions.

Preferably, I provide an actuating means for the supplementary nut shown in the drawings which comprises a shaft adapted to oscillate through a small angle. Oscillation of this shaft serves to oscillate the supplemental nut through a small angle and also serves to tighten and loosen one or the other of a pair of springs engaging diametrically opposite points on the supplemental nut so that the supplemental nut is forced by spring means in one direction when the screw is being rotated in a given direction and in the opposite direction when the screw is forced in the reverse direction.

With these and other objects in view, my invention consists in the features of construction and operation set forth in the following specification and illustrated in the accompanying drawing.

In the accompanying drawing annexed hereto and forming a part of this specification, I have shown my invention embodied in a gear shaping machine, but it will be understood that the invention can be otherwise embodied and that the drawing is not to be construed as defining or limiting the scope of this invention, the claims appended to this specification being relied upon for that purpose.

In the drawing:

Figure 1 shows a plan view of an embodiment of the invention.

Fig. 2 shows a sectional view in elevation of the main and supplementary nut.

Fig. 3 shows a sectional view taken on line 3—3 of Fig. 1.

Fig. 4 shows a detail of the invention.

In the above mentioned drawing, I have shown but one modification of the invention which is now deemed preferable, but it is to be understood that changes and modifications may be made within the scope of the appended claims without departing from the spirit thereof.

Briefly, my invention in its broadest aspect comprises the following principal parts: first, a precision screw forming a part of a machine tool; second, a nut engaging the screw and directly engaging a part of the machine which part is to be moved during the machine operation; third, a supplemental nut also engaging the screw and threaded to the first nut by a screw having a different lead than the precision screw; and fourth, an oscillating shaft actuated through rotation of the precision screw and adapted to control the movements of the supplemental nut relative to the fixed nut so that the lost motion between the screw and fixed nut may be taken up on either side of the screw threads of the main nut.

Referring more in detail to the figures of the drawing, at 10 is shown a machine base, on which a table 11 is adapted to slide. Suitable guideways which are shown at 12, are provided on which the table 11 may slide. To control the movement of the table 11 on the base 10 and to provide means whereby it may be moved predetermined distances along the base, I provide a precision screw 15. Screw 15 is mounted in suitable bearings 16 near the ends of the base so that it may be readily rotated by means of a pulley or other means mounted on an extension member 17. The extension member 17 is coupled to the screw 15 by means of a lost motion clutch 18 so that a slight amount of angular movement may be given the extension member 17 before the screw 15 is rotated.

Mounted on the screw 15 is a nut 20 rigidly attached to the table 11 by suitable screws 21 and by a projection 22 fitting a corresponding depression formed in the table 11. At one end of the nut 20 is a projection 25 having threads 26 on its inner surface which have, in the present instance, an increased lead compared to the screw 15. Entering this threaded projection 25 is a supplemental nut 30, the interior surface of which is in engagement with the screw 15, one end of its external surface having threads engaging the threads 26.

It will be seen that by rotating the supplemental nut 30 relative to the nut 20, the internal screw threads on the supplemental nut 30 will engage either side of the threads on screw 15, and, as the threads 25 are of materially increased lead, rotating the supplemental nut 30 relative to the nut 20 in opposite directions will cause the threads on the supplemental nut 30 to engage either side of the screw threads 15.

If, with the supplemental nut adjusted to take up the back lash in one direction of rotation of the screw 15, the screw 15 should be reversed in its rotation, the effect of the supplemental nut engaging on the sides of the screw threads 15 would be to rigidly bind it against the threads on screw 15 and prevent reverse rotation of the screw 15. It is necessary therefore that with each reversal of movement of the screw 15 the nut 30 be first angularly rotated to take up the lost motion against the opposite side of the screw threads. That is, with each reversal of rotary movement of the screw 15, the supplementary nut 30 must be forced toward or away from the fixed nut 20 so that its screw threads will engage the opposite side of the screw threads on the screw 15. When the screw 15 is being rotated to advance the table 11 toward the right the supplementary nut must be forced in such a direction that it will also force the table in the same direction. In other words, the screw threads in the nuts 20 and 30 must press against opposite sides of the screw threads 15. At each reversal of direction of motion of the screw 15, the supplementary nut 30 must be first forced in the opposite direction so that it will prevent binding of the screw 15 between the nuts 20 and 30.

For this purpose, I provide a gear 35 mounted on the screw 15. Preferably, this gear 35 is attached to the driving connection 17 which may, for convenience and economy of space contain the lost motion clutch 18. This is provided for a purpose which will be apparent later. In mesh with the gear 35 is another gear 36, this latter gear being mounted on a shaft 40. The connection between the gear 36 and the shaft 40 as shown in Fig. 1 comprises a friction clutch 41. This, as shown, comprises a series of plates or disks alternately fastened to the shaft 40 and the gear 36. These plates or disks are pressed toward each other by springs 42 so that a frictional force is exerted always tending to press shaft 40 in one direction or the other dependent upon the direction of rotation of the gear 36. Mounted on the shaft 40 is a limiting device more clearly shown in Fig. 4. This comprises a collar 45 on which are provided lugs 46 and 47. Inserted in these lugs are adjusting screws 48. In the path of movement of these screws is mounted a pin 50. This pin 50 is rigidly mounted in the base 10, and prevents the shaft 40 from rotating more than the angular distance between the screws 48. As soon as one of the adjusting screws 48 takes up against the pin 50, further rotation of the shaft 40 is prevented and the gear 36 slips about the shaft 40 by means of the friction clutch 41.

Mounted on shaft 40 is a gear 60. This gear 60 slidably engages the shaft 40 by a suitable pin or key engaging the spline 60ª extending longitudinally along the shaft 40.

Also slidable on the shaft 40 is a member 61 made fast in any suitable way to the lower surface of the table 11. This member 61 is provided with a short shaft 62 one end of which is provided with a small gear 63 meshing with the gear 60. The other end of the short shaft 62 is provided with a pin 64 extending diametrically through a head formed on the shaft 62 and extending on either side beyond said head.

Carried by the supplemental nut 30 is an arm 70 which is rigidly fastened thereto and oscillates with movements of the supplemental nut 30. This arm 70 is in the path of movement of, and is intercepted by the pin 64 provided in the short shaft 62. Preferably this arm 70 is provided with extensions 71 and 72 suitably shaped on their adjacent sides to be engaged by the pin 64.

Also attached to the supplemental nut 30 are oppositely positioned springs 75 and 76. These, as shown, are attached to diametrically opposite points of the supplemental nut 30 and extend to and are fastened to links 78 and 79. These links 78 and 79 are pivotally attached to a collar 80 splined to shaft 40, and, as the shaft 40 oscillates, are moved in such a way as to tighten one spring and loosen the other.

The oscillation of the shaft 40 and the consequent movement of the links 78 and 79 tends to force the supplementary nut 30 about the screw 15. In order to make certain that the supplementary nut 30 is rotated at each reversal of the screw 15, the pin 64 is provided. Oscillation of shaft 40 rotates gear 63 and pin 64, and, as pin 64 is in the path of movement of the arm 70, it engages one of the extensions 71 or 72 thus forcing the arm to begin its movement. The movement of the supplementary nut 30 permitted by the distance between extensions 71 or 72 is sufficient to cause the threads in the supplementary nut 30 to take up against the opposite sides of the threads on screw 15.

Coming now to a description of the operation of my device, it will be seen that during normal operation of the screw 15 and while it is being rotated in one direction the supplemental nut 30 will be held toward or away from the fixed nuts 20 by one of the tension springs 75 or 76 and by reason of the threaded connection between the fixed and supplementary nuts. As soon as the direction of rotation of the driving extension 17 is reversed the first effect is to rotate the gears 35 and 36 slightly and therefore oscillate the shaft 40. Continued rotation of the driving extension 17 continues to rotate the gear 36 and causes the friction clutch 41 to slip and the shaft 40 remains in its new position held against one of the adjustable screws 48. This oscillation of the shaft 40 also rotates the collar 80 on which the links 78 and 79 are pivotally mounted and has the effect of tightening one spring 75 or 76 and loosening the other so that the supplemental nut 30 will be forced in the opposite direction.

Thus the supplemental nut 30 is forced from its original position and assumes a new position, which position is determined by the amount of back lash, or lost motion, between the threads on the screw 15 and the fixed nut 20. With each reversal of rotation of the screw 15, the supplemental nut is forced to its opposite position and is held in that position by means of the tension of one or the other of springs 78 or 79.

It will be noticed that the oscillation of the shaft 40 and the adjusting of the supplemental nut 30 takes place at each reversal of rotation of the extension 17 prior to the actual movement of the screw 15. This is by reason of the lost motion clutch 18 which permits a slight relative movement between gear 35 and the screw 15 before the screw 15 is rotated.

What I claim is:

1. A lost motion compensating device comprising in combination, a lead screw, a pair of nuts engaging said lead screw, a threaded connection between said nuts, and frictionally operated means to rotate one nut relative to the other a limited distance to force said nuts toward each other when said screw is rotated in one direction and away from each other when said screw is rotated in the opposite direction.

2. A lost motion compensating device comprising in combination, a lead screw, a pair of nuts engaging said lead screw, threaded means connecting said nuts together and having a lead different from said lead screw, and means to rotate one of said nuts a limited distance relative to the other in one direction when the lead screw is rotated in one direction and in the opposite direction when the lead screw is rotated in the opposite direction whereby lost motion may be taken up between said screw and nuts upon either side of the threads on the lead screw.

3. A lost motion compensating device comprising in combination, a lead screw, a pair of nuts engaging said lead screw, threaded means connecting said nuts together and having a lead different from said lead screw, and frictionally operated means to rotate one of said nuts a limited distance relative to the other in one direction when the lead screw is rotated in one direction and in the opposite direction when the lead screw is rotated in the opposite direction whereby lost motion may be taken up between said screw and nuts upon either side of the threads on the lead screw.

4. A lost motion compensating device for a lead screw comprising in combination, a base, a movable member thereon, a lead screw adapted to be rotated in either direction, a pair of nuts engaging said screw, one of said nuts attached directly and fixedly to said movable member, means to rotate one of said nuts relative to the other, threaded means to force said rotatably mounted nut toward or from said other nut upon rotation of the rotatable nut relative to the fixed nut whereby lost motion between said nuts and lead screw is taken up, and means to effect rotation of said rotatable nut upon reversal of movement of said movable member.

5. A lost motion compensating device for a lead screw comprising in combination, a base, a movable member thereon, a lead screw adapted to be rotated in either direction to move said member in opposite directions, a pair of nuts engaging said screw, one of said nuts directly and fixedly engaging said movable member, means to rotate one of said nuts relative to the other, threaded means to force said rotatably mounted nut toward said other nut when said lead screw is rotated in one direction and away from said other nut when said lead screw is rotated in the opposite direction, and means to effect rotative movement of said rotatable nut upon reversal of movement of said movable member.

6. A lost motion compensating device comprising in combination, a lead screw, driving means for said lead screw, a pair of nuts engaging said lead screw, threaded means connecting said nuts together and having a lead different from said lead screw, frictionally operated means directly driven by said driving means for said lead screw to rotate one of said nuts a limited distance relative to the other when the rotation of said lead screw driving means is reversed, and a lost motion device in the driving means for said lead screw whereby said rotatable nut will be rotated before said lead screw upon reversal of the means for driving said lead screw.

In testimony whereof, I hereto affix my signature.

MAX MAAG.